United States Patent
Sharma et al.

(10) Patent No.: US 11,291,038 B2
(45) Date of Patent: Mar. 29, 2022

(54) DYNAMIC GRANT SWITCH

(71) Applicant: ARRIS Enterprises LLC, Suwanee, GA (US)

(72) Inventors: Ravi Sharma, Santa Clara, CA (US); Awaiz Khan, Milpitas, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 216 days.

(21) Appl. No.: 16/797,127

(22) Filed: Feb. 21, 2020

(65) Prior Publication Data
US 2021/0266948 A1  Aug. 26, 2021

(51) Int. Cl.
*H04W 72/14* (2009.01)
*H04W 72/12* (2009.01)
*H04W 16/14* (2009.01)

(52) U.S. Cl.
CPC ........... *H04W 72/14* (2013.01); *H04W 16/14* (2013.01); *H04W 72/1273* (2013.01)

(58) Field of Classification Search
USPC ........................................................ 370/329
See application file for complete search history.

(56) References Cited

U.S. PATENT DOCUMENTS

| 2014/0162667 | A1* | 6/2014 | Mueck | H04W 72/04 455/450 |
| 2018/0176284 | A1 | 6/2018 | Strater et al. | |
| 2018/0376342 | A1* | 12/2018 | MacMullan | H04W 24/02 |
| 2020/0236557 | A1* | 7/2020 | Richardson | H04W 24/04 |
| 2020/0412565 | A1* | 12/2020 | Sanders | H04W 4/38 |
| 2021/0029562 | A1* | 1/2021 | Notargiacomo | H04W 24/08 |

FOREIGN PATENT DOCUMENTS

| CN | 101449603 A | * | 6/2009 | ............ H04W 16/14 |
| CN | 102026206 A | * | 4/2011 | |
| EP | 3281451 A1 | | 2/2018 | |
| FR | 3103992 A1 | * | 6/2021 | ............ H04W 16/14 |
| WO | WO-2010096964 A1 | * | 9/2010 | ............ H04W 48/18 |

(Continued)

OTHER PUBLICATIONS

Search Report, European Patent Appl. No. 20197317.9, dated Mar. 12, 2021.

*Primary Examiner* — Jamaal Henson
(74) *Attorney, Agent, or Firm* — Steven Stupp; Stewart Wiener

(57) ABSTRACT

During operation, a radio node may receive, from a computer, approval and authorization to use a first grant for a first portion of an SLA band of frequencies, and approval and authorization to use a second grant for a second portion of the SLA band of frequencies, where the first grant is a primary grant and the second grant is a secondary grant in a supplemental downlink carrier aggregation. Then, the interface circuit may receive, from the computer, a heartbeat response that includes a grant termination message for the first grant, where the grant termination message includes a warning that indicates that the use of the first portion of the SLA band of frequencies is revoked after a time interval. In response to the grant termination message, the interface circuit may define the second grant as the primary grant for the supplemental downlink carrier aggregation.

20 Claims, 5 Drawing Sheets

(56) References Cited

FOREIGN PATENT DOCUMENTS

| WO | 20140145073 A1 | 9/2014 | |
|---|---|---|---|
| WO | WO-2016195751 A1 * | 12/2016 | ............. H04B 1/715 |
| WO | WO-2019076428 A1 * | 4/2019 | ......... H04L 67/2809 |
| WO | WO-2020095532 A1 * | 5/2020 | ............ H04W 24/02 |
| WO | WO-2020223010 A1 * | 11/2020 | ............ H04W 28/16 |
| WO | WO-2021119051 A1 * | 6/2021 | ............ H04W 16/14 |

* cited by examiner

DYNAMIC GRANT SWITCH

BACKGROUND

Field

The described embodiments relate to techniques for communicating information among electronic devices. Notably, the described embodiments relate to techniques for switching primary and secondary grants to portions of a shared-access-license (SLA) band of frequencies when a spectrum allocation server (SAS) indicates that the primary grant will be terminated.

Related Art

While many electronic devices communicate with each other via large networks owned by a network operator, small-scale networks associated with entities (such as a company or an organization) are increasingly common. In principle, the small-scale network complements the service offered by the network operator and can offer improved communication performance, such as in a particular venue or environment. In practice, the communication performance of small-scale networks (and large networks) is often constrained by resources, such as bandwidth in a shared communication channel.

In order to address these constraints, additional bands of frequencies are being used by large networks and small-scale networks. For example, the shared-license-access band of frequencies near 3.5 GHz (notably, the 150 MHz of bandwidth between 3.55 GHz and 3.7 GHz) is being used for general-purpose communication. This shared-license-access band of frequencies is referred to as 'Citizens Broadband Radio Service' or CBRS.

In CBRS, a radio node (which is sometimes referred to as a 'Citizens Band Service Device' or CBSD) may provide a grant request to a SAS (a cloud-based service that manages wireless communication in the CBRS) to reserve a portion of the shared-license-access band of frequencies for its use. For example, a radio node may request a grant to reserve 5 MHz of spectrum from the SAS. If the requested portion of the shared-license-access band of frequencies is available, the SAS may provide a grant response to the radio node with approval of a grant for the requested portion of the shared-license-access band of frequencies. Then, the radio node may provide a heartbeat request to the SAS to request authorization to transmit in the granted portion of the shared-license-access band of frequencies. When the radio node receives a subsequent heartbeat response from the SAS, the radio node is authorized to transmit in the granted portion of the shared-license-access band of frequencies.

In principle, a radio node may obtain multiple approved and authorized grants for different portions of the CBRS. These grants may have independent carriers or channels. However, in some circumstances, the grants are interrelated. Notably, in a supplemental downlink for carrier aggregation, one of the grants may be designated as a primary grant with an anchor carrier or channel, and a remainder of the grants may be designated as secondary grants for downlink only that depend on the primary grant. In particular, if the SAS revokes the primary grant, then any secondary grants may also go down. This can degrade or interrupt service provided by the radio node.

SUMMARY

A radio node that dynamically switches or swaps grants is described. This radio node includes: a node or connector; and an interface circuit that communicates with the computer. During operation, the interface circuit may receive, associated with a computer, approval and authorization to use a first grant for a first portion of an SLA band of frequencies, and approval and authorization to use a second grant for a second portion of the SLA band of frequencies, where the first grant is a primary grant and the second grant is a secondary grant in a supplemental downlink carrier aggregation. Subsequently, the interface circuit may provide a heartbeat request addressed to the computer. Then, the interface circuit may receive, associated with the computer, a heartbeat response that includes grant termination message for the first grant, where the grant termination message includes a warning that indicates that the use of the first portion of the SLA band of frequencies is revoked after a time interval. In response to the grant termination message, the interface circuit may define the second grant as the primary grant for the supplemental downlink carrier aggregation.

Note that by defining the second grant as the primary grant, the second grant and the supplemental downlink carrier aggregation may remain active after the use of first portion of the SLA band of frequencies is revoked.

Moreover, after the time interval has elapsed, the interface circuit may cease use of the first portion of the SLA band of frequencies. Then, the interface circuit may provide, addressed to the computer, a grant request for the first portion of the SLA band of frequencies. This may allow the radio node to re-establish the first grant.

Furthermore, the interface circuit may receive, associated with the computer, approval and authorization to use a third grant for a third portion of the SLA band of frequencies, where the third grant is also a secondary grant in the supplemental downlink carrier aggregation. Prior to defining the second grant as the primary grant, the interface circuit may select the second grant from the second grant and the third grant based at least in part on communication-performance metrics of the second portion of the SLA band of frequencies and the third portion of the SLA band of frequencies.

Additionally, the communication with the computer may use wired communication.

Note that the computer may include a SAS. Moreover, a given portion of the SLA band of frequencies may be included in a CBRS.

Moreover, the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Another embodiment provides the computer.

Another embodiment provides a computer-readable storage medium with program instructions for use with the radio node. When executed by the radio node, the program instructions cause the radio node to perform at least some of the aforementioned operations in one or more of the preceding embodiments.

Another embodiment provides a method, which may be performed by the radio node. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
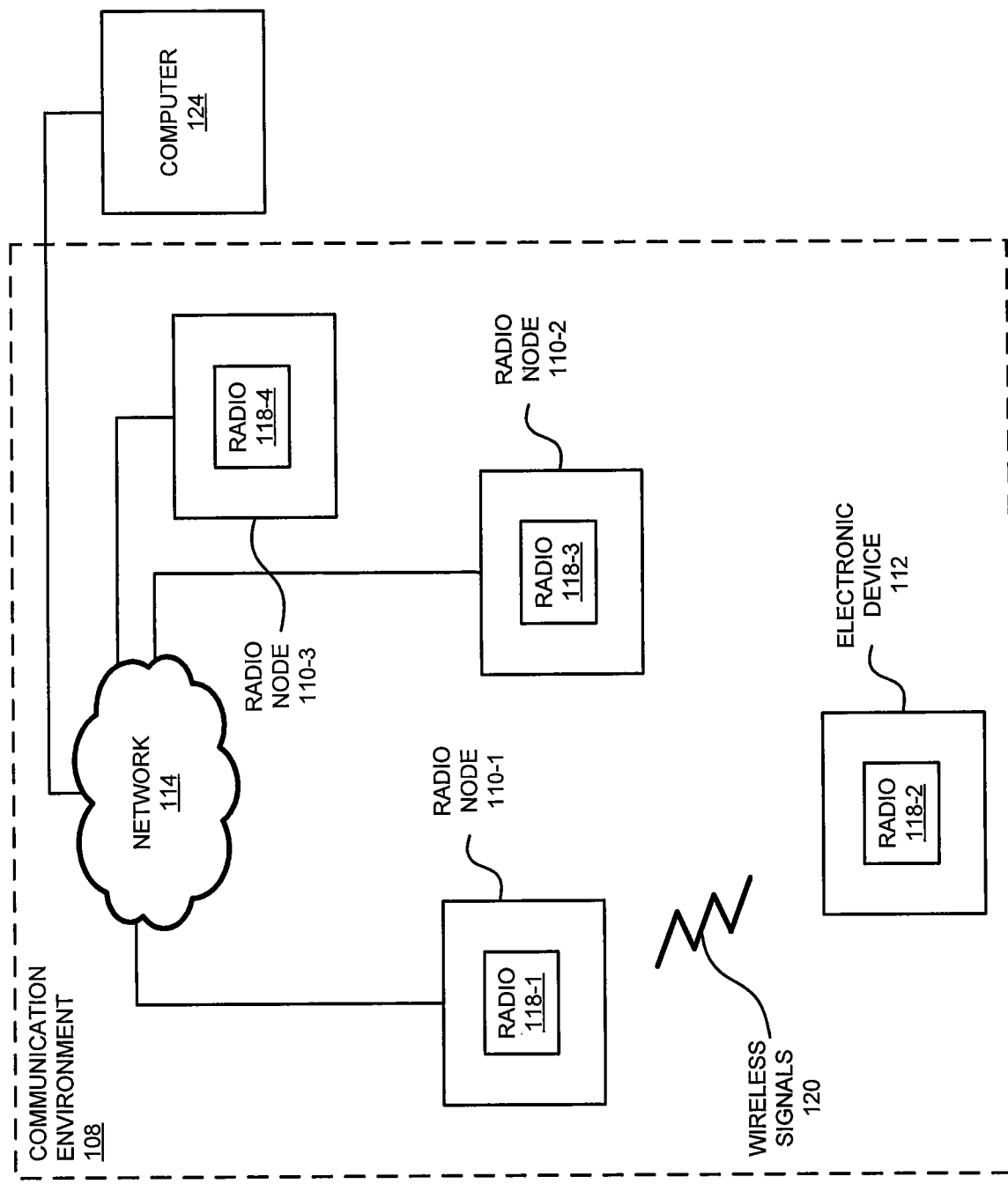
FIG. 1 is a block diagram illustrating an example of communication among a computer, radio nodes and electronic devices in a system in accordance with an embodiment of the present disclosure.

A radio node that dynamically switches grants is described. During operation, the radio node may receive, from a computer, approval and authorization to use a first grant for a first portion of an SLA band of frequencies, and approval and authorization to use a second grant for a second portion of the SLA band of frequencies, where the first grant is a primary grant and the second grant is a secondary grant in a supplemental downlink carrier aggregation. Subsequently, the radio node may provide a heartbeat request to the computer. Then, the interface circuit may receive, from the computer, a heartbeat response that includes a grant termination message for the first grant, where the grant termination message includes a warning that indicates that the use of the first portion of the SLA band of frequencies is revoked after a time interval. In response to the grant termination message, the interface circuit may define the second grant as the primary grant for the supplemental downlink carrier aggregation.

By dynamically switching or redefining the second grant as the primary grant for the supplemental downlink carrier aggregation, this communication technique may help ensure continuity and quality of service from the radio node. Notably, by redefining the second grant as the primary grant, the communication technique may ensure that the supplemental downlink carrier aggregation does not go down, even though the use of the first portion of the SLA band of frequencies has been revoked. Consequently, the communication technique may provide improved communication performance and quality of service in a network that includes the radio node.

We now describe some embodiments of the communication technique. A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication technique.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, there are still often circumstances where the network performance and quality of a cellular-telephone network is degraded. As noted previously, for supplemental downlink carrier aggregation, when a primary grant is revoked or terminated by an SLA, any secondary grants and, thus, the supplemental downlink carrier aggregation may go down. This can degrade or disrupt service. These challenges are addressed in the communication technique described below.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among electronic devices according to some embodiments. Notably, radio nodes 110 can communicate LTE data frames or packets using LTE with an electronic device 112 (which is sometimes referred to as 'user equipment' or UE, such as a cellular telephone and, more generally, a fixed or portable electronic device). Again, while LTE is used as an example of a cellular protocol, the embodiments herein are not so limited. Moreover, radio nodes 110 may also communicate (via wireless or wired communication, such as Ethernet, in network 114) with each other and with computer 124 (such as a SAS).

Figure 2:
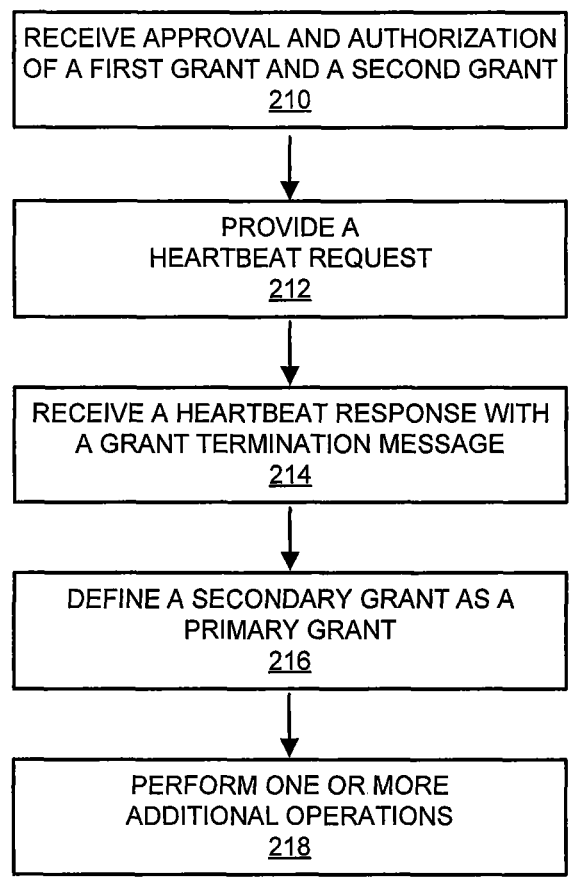
FIG. 2 is a flow diagram illustrating an example of a method for dynamically switching grants using a radio node in FIG. 1 in accordance with an embodiment of the present disclosure.

As described further below with reference to FIGS. 2-4, one or more of radio nodes 110 may perform a communication technique by communicating with computer 124 via network 114. Using radio node 110-1 as an example, this radio node may provide a grant request to computer 124 to reserve a portion of a spectrum or bandwidth (such as a portion of the spectrum in a shared-license-access band of frequencies or another band of frequencies) for its use. (In the discussion that follows, CBRS is used as an illustrative example of the communication technique.) For example, radio node 110-1 may request a grant to reserve 5, 10, 20, 40, 80, 100 or 150 MHz of spectrum in CBRS from computer 124. In response, computer 124 may provide a grant response to radio node 110-1 with approval of a grant for the requested portion of the shared-license-access band of frequencies.

Then, radio node 110-1 may request from computer 124 authorization to transmit in the granted portion of the shared-license-access band of frequencies. For example, radio node 110-1 may provide a keep-alive message (such as a heartbeat request) to computer 124 in order to request authorization to transmit in the granted portion of the shared-license-access band of frequencies. When radio node 110-1 receives a keep-alive response from computer 124, then radio node 110-1 may be authorized to transmit in the granted portion of the shared-license-access band of frequencies until a transmit expire time has elapsed.

As noted previously, radio node 110-1 may obtain multiple approved and authorized grants for different portions of the CBRS (such as different carriers or channels). Two of more of the grants may be combined using supplemental downlink carrier aggregation in LTE. Notably, a first grant for a first portion of the CBRS may be designated a primary grant, and one or more additional grants for one or more additional portions of the CBRS may be designated as secondary (downlink only) grants.

In order to prevent the supplemental downlink carrier aggregation from going down entirely, when a primary grant is revoked by computer 124, radio node 110-1 may dynamically switch or redefine one of the additional grants as a new primary grant, thereby replacing the soon-to-be lost previous primary grant to the first portion of the CBRS. Notably, after receiving from computer 124 approval and authorization to use a first grant for a first portion of the CBRS and a second grant for a second portion of the CBRS, radio node 110-1 may specify that the first grant is a primary grant and the second grant is a secondary grant in a supplemental downlink carrier aggregation.

Subsequently, radio node 110-1 may provide a heartbeat request to computer 124. Then, radio node 110-1 may receive from computer 124 a heartbeat response that includes a grant termination or revocation message for the first grant, where the grant termination message includes a warning that indicates that the use of the first portion of the CBRS is revoked after a time interval (such as 1, 3, 5 or 10 min.). In response to the grant termination message, radio node 110-1 may define (or switch) the second grant as the primary grant for the supplemental downlink carrier aggregation. By defining the second grant as the primary grant, the second grant and the supplemental downlink carrier aggregation may remain active after the use of first portion of the CBRS is revoked.

Moreover, after the time interval has elapsed, radio node 110-1 may cease use of the first portion of the CBRS. Then, radio node 110-1 may provide, to computer 124, a grant request for the first portion of the CBRS. This may allow the radio node to re-establish the first grant by completing the grant-request and authorization process described previously.

Note that when there is more than one secondary grant, the radio node may select which one of the secondary grants to define as the primary grant, e.g., based at least in part on communication-performance metrics of or in the portions of the CBRS that are associated with the multiple secondary grants. For example, a given communication-performance metric in a given portion of the CBRS may include: a received signal strength indicator (RSSI); or a reference signal received power (RSRP). Alternatively or additionally, the secondary grant that will be re-defined as the primary grant in the communication technique may be selected based at least in part on interference or interference signal(s) in the associated portion of the CBRS.

The aforementioned operations in the communication technique may be performed, e.g., once (such as when radio node 110-1 is turned on), or as needed (such as when the primary grant is revoked).

In this way, the communication technique may keep the second grant and the supplemental downlink carrier aggregation from going down when the original primary grant is revoked by computer 124. This may prevent degradation or disruption of service in a network that includes radio node 110-1.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 5:
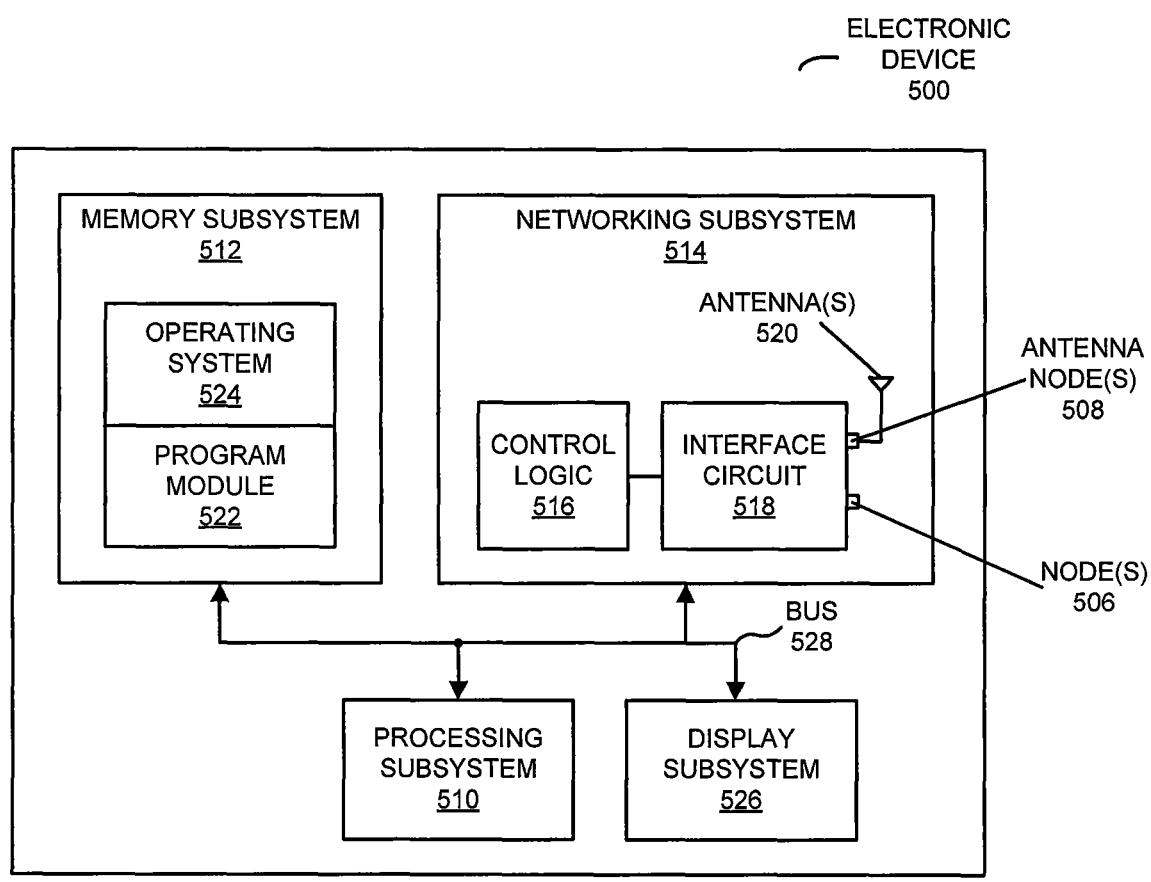
FIG. 5 is a block diagram illustrating an example of an electronic device in accordance with an embodiment of the present disclosure.

As described further below with reference to FIG. 5, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic device's with the networking subsystems that enable radio nodes 110 and electronic device 112 to wirelessly communicate with each other. This wireless communication can include transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving frames that include packets.

We now describe embodiments of the method. FIG. 2 presents a flow diagram illustrating an example of a method 200 for dynamically switching grants, which may be performed by a radio node (such as one of radio nodes 110 in FIG. 1). During operation, an interface circuit in the radio node may receive, associated with a computer, approval and authorization to use a first grant (operation 210) for a first portion of an SLA band of frequencies, and approval and authorization to use a second grant (operation 210) for a second portion of the SLA band of frequencies, where the first grant is a primary grant and the second grant is a secondary grant in a supplemental downlink carrier aggregation.

Subsequently, the interface circuit may provide a heartbeat request (operation 212) to the computer. Then, the interface circuit may receive, associated with the computer, a heartbeat response that includes a grant termination message (operation 214) for the first grant, where the grant termination message includes a warning that indicates that the use of the first portion of the SLA band of frequencies is revoked after a time interval. In response to the grant termination message, the interface circuit may define the second grant as the primary grant (operation 216) for the supplemental downlink carrier aggregation. Note that by defining the second grant as the primary grant, the second grant and the supplemental downlink carrier aggregation may remain active after the use of first portion of the SLA band of frequencies is revoked.

In some embodiments, the radio node optionally performs one or more additional operations (operation 218). For example, after the time interval has elapsed, the interface circuit may cease use of the first portion of the SLA band of frequencies. Moreover, the interface circuit may provide, addressed to the computer, a grant request for the first portion of the SLA band of frequencies. This may allow the radio node to re-establish the first grant.

Furthermore, the interface circuit may receive, associated with the computer, approval and authorization to use a third grant for a third portion of the SLA band of frequencies, where the third grant is also a secondary grant in the supplemental downlink carrier aggregation. Prior to defining the second grant as the primary grant, the interface circuit may select the second grant from the second grant and the third grant based at least in part on communication-performance metrics of the second portion of the SLA band of frequencies and the third portion of the SLA band of frequencies.

Note that the computer may include a SAS. Moreover, a given portion of the SLA band of frequencies may be included in a CBRS.

In some embodiments of method 200, there may be additional or fewer operations. Furthermore, the order of the operations may be changed, and/or two or more operations may be combined into a single operation.

Figure 3:
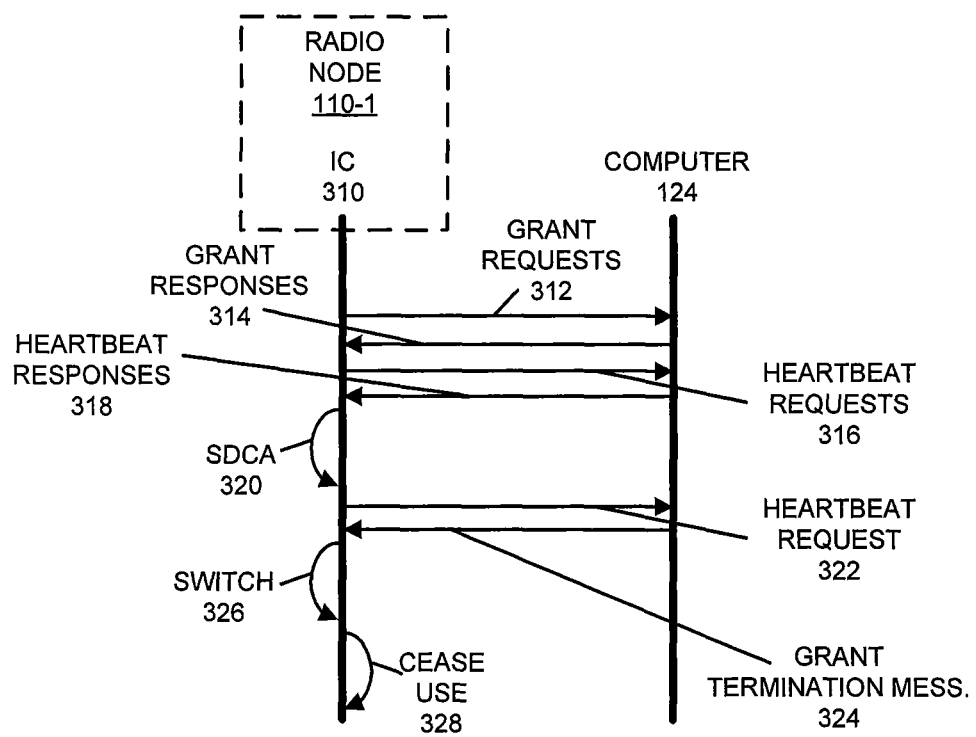
FIG. 3 is a drawing illustrating an example of communication among the electronic devices in FIG. 1 in accordance with an embodiment of the present disclosure.

Embodiments of the communication technique are further illustrated in FIG. 3, which presents a drawing illustrating an example of communication among radio node 110-1 and computer 124. In FIG. 3, an interface circuit (IC) 310 in radio node 110-1 may provide grant requests 312 to computer 124 for grants for different portions of an SLA band of frequencies. In response, computer 124 may provide grant responses 314 that approve the grants for the different portions of the SLA band of frequencies.

After receiving grant responses 314, interface circuit 310 may provide heartbeat requests 316 to computer 124 requesting authorizations for radio node 110-1 to use the grants for the different portions of the SLA band of frequencies. In response, computer 124 may provide heartbeat responses 318 with the authorizations.

Next, radio node 110-1 may specify a first grant in the grants as a primary grant and at least a second grant in the grants as a secondary grant in a supplemental downlink carrier aggregation (SDCA) 320.

Subsequently, radio node 110-1 may provide a heartbeat request 322 to computer 124. Then, computer 124 may provide a heartbeat response that includes a grant termination message 324 to radio node 110-1 for the first grant, where the grant termination message includes a warning that indicates that the use of the portion of the SLA band of frequencies in the primary grant is revoked after a time interval (such as 1, 3, 5 or 10 min.). In response to receiving the grant termination message 324, interface circuit 310 may define or switch 326 the second grant as the primary grant for the supplemental downlink carrier aggregation 320.

After the time interval has elapsed, interface circuit 310 may cease use 328 of the revoked portion of the SLA band of frequencies. Moreover, interface circuit 310 may repeat the grant-approval and authorization process to re-establish or get back use of the revoked portion of the SLA band of frequencies or a different portion of the SLA band of frequencies.

While FIG. 3 illustrates communication between components using unidirectional or bidirectional communication with lines having single arrows or double arrows, in general the communication in a given operation in this figure may involve unidirectional or bidirectional communication.

In some embodiments of the communication technique, a CBSD may dynamically switch or swap the role of a secondary grant and a primary grant when a portion of the CBRS associated with the current primary grant is revoked by a SAS. This may prevent the CBSD from losing the ability to use the secondary grant and an associated supplemental downlink carrier aggregation.

Figure 4:
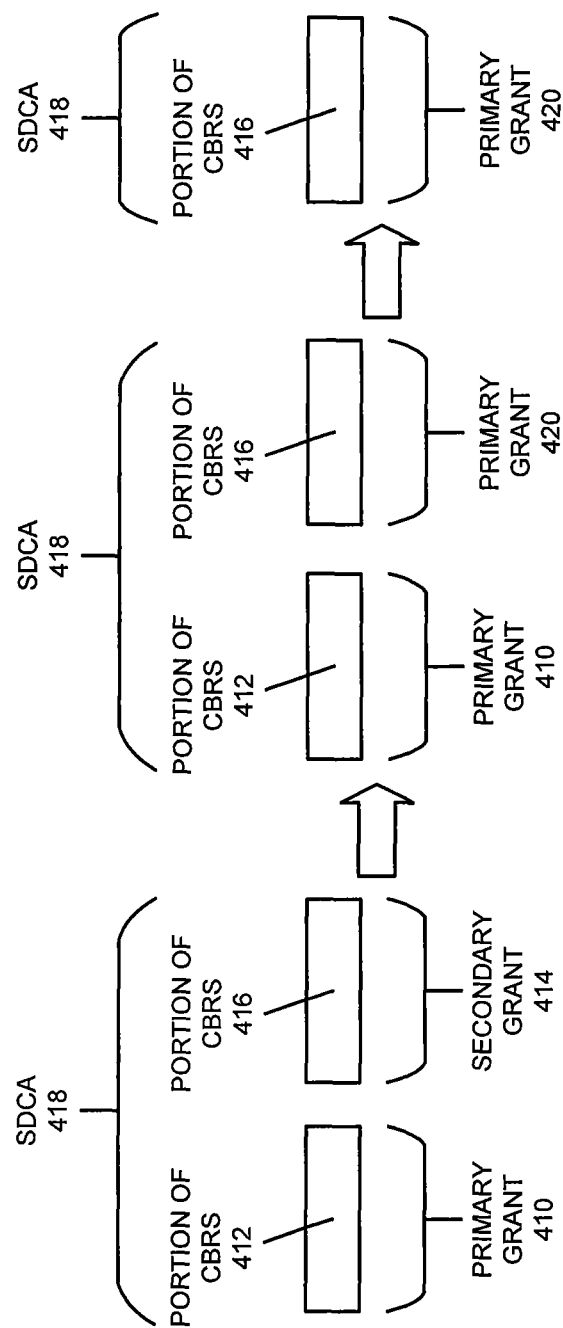
FIG. 4 is a drawing illustrating an example of a technique for dynamically switching grants in accordance with an embodiment of the present disclosure.

This is illustrated in FIG. 4, which presents a drawing illustrating an example of a technique for dynamically switching grants in a CBRS. Notably, initially there may be a primary grant 410 to a portion of the CBRS 412 and a secondary grant 414 to a portion of the CBRS 416, where primary grant 410 and secondary grant 414 are included in a supplemental downlink carrier aggregation 418.

In response to a heartbeat request from the CBSD, the SAS may provide a heartbeat response that includes a grant termination message for the primary grant 410, the CBRS may switch or redefine secondary grant 414 as primary grant 420 in the supplemental downlink carrier aggregation 418. Then, the CBRS may cease using the primary grant 410 as instructed based on the grant termination message.

For example, the CBRS may have a primary grant for 20 MHz and a secondary grant for 20 MHz. In general, if the primary grant goes down, the secondary grant may also be lost. When this occurs, it can take, e.g., up to a few days to restore the primary and/or the secondary grants.

Because the CBSD also wants a primary grant to be running or active (so that a supplemental downlink carrier aggregation is not lost), when a current primary grant is revoked, the CBSD may switch or redefine a secondary grant as a new primary grant. Notably, the bandwidth or portion of the CBSD associated with the secondary grant may be redefined as the new primary grant. Then, the CBSD may cease using the bandwidth or portion of the CBRS associated with the previous primary grant. Next, the CBSD may attempt to get the portion of the CBRS associated with the previous primary grant re-approved and authorized by the SAS.

We now describe embodiments of an electronic device, which may perform at least some of the operations in the communication technique. FIG. 5 presents a block diagram illustrating an example of an electronic device 500 in accordance with some embodiments, such as one of radio nodes 110, electronic device 112 computer 124. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs or program modules may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that includes one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a pad, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wireless communication techniques may be used. For example, instead of Ethernet, a communication protocol that is compatible with the Internet Protocol is used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Thus, the communication technique may be implemented at runtime of program module 522. Alternatively or additionally, at least some of the operations in the communication technique may be implemented in a physical layer, such as hardware in interface circuit 518.

While examples of numerical values are provided in the preceding discussion, in other embodiments different numerical values are used. Consequently, the numerical values provided are not intended to be limiting.

While the preceding embodiments illustrated the use of the communication technique with CBRS (e.g., a frequency band near 3.5 GHz), in other embodiments of the communication technique different wireless signals and/or different frequency band(s) may be used. For example, the wireless signals may be communicated in one or more bands of frequencies, including: 900 MHz, 2.4 GHz, 5 GHz, 60 GHz, and/or a band of frequencies used by LTE or another cellular-telephone communication protocol.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
   a node or connector configured to communicatively couple to a network;
   an interface circuit, communicatively coupled to the node or connector, configured to communicate with a computer, wherein the interface circuit is configured to:
   receive, associated with the computer, approval and authorization to use a first grant for a first portion of a shared-license-access (SLA) band of frequencies, and approval and authorization to use a second grant for a second portion of the SLA band of frequencies, wherein the first grant is a primary grant and the second grant is a secondary grant in a supplemental downlink carrier aggregation;
   provide a heartbeat request addressed to the computer;
   receive, associated with the computer, a heartbeat response comprising a grant termination message for the first grant, wherein the grant termination message comprises a warning that indicates that the use of the first portion of the SLA band of frequencies is revoked after a time interval; and
   in response to the grant termination message, define the second grant as the primary grant for the supplemental downlink carrier aggregation.

2. The radio node of claim 1, wherein, by defining the second grant as the primary grant, the second grant and the supplemental downlink carrier aggregation remain active after the use of first portion of the SLA band of frequencies is revoked.

3. The radio node of claim 1, wherein, after the time interval has elapsed, the interface circuit is configured to cease use of the first portion of the SLA band of frequencies.

4. The radio node of claim 3, wherein the interface circuit is configured to provide, addressed to the computer, a grant request for the first portion of the SLA band of frequencies.

5. The radio node of claim 1, wherein the interface circuit is configured to receive, associated with the computer, approval and authorization to use a third grant for a third portion of the SLA band of frequencies;
   wherein the third grant is also a secondary grant in the supplemental downlink carrier aggregation; and
   wherein, prior to defining the second grant as the primary grant, the interface circuit is configured to select the second grant as the primary grant from the second grant and the third grant based at least in part on communication-performance metrics of the second portion of the SLA band of frequencies and the third portion of the SLA band of frequencies.

6. The radio node of claim 1, wherein the computer comprises a spectrum allocation server (SAS).

7. The radio node of claim 1, wherein a given portion of the SLA band of frequencies comprises a band of frequencies associated with a Citizens Broadband Radio Service (CBRS).

8. The radio node of claim 1, wherein the communication with the computer comprises wired communication.

9. The radio node of claim 1, wherein the radio node comprises: an Evolved Node B (eNodeB), a Universal Mobile Telecommunications System (UMTS) NodeB and radio network controller (RNC), or a New Radio (NR) gNB or gNodeB.

10. A non-transitory computer-readable storage medium for use in conjunction with a radio node, the computer-readable storage medium storing program instructions that, when executed by the radio node, cause the radio node to perform operations comprising:
   receiving, associated with a computer, approval and authorization to use a first grant for a first portion of a shared-license-access (SLA) band of frequencies, and approval and authorization to use a second grant for a second portion of the SLA band of frequencies, wherein the first grant is a primary grant and the second grant is a secondary grant in a supplemental downlink carrier aggregation;
   providing a heartbeat request addressed to the computer;
   receiving, associated with the computer, a heartbeat response comprising a grant termination message for the first grant, wherein the grant termination message comprises a warning that indicates that the use of the first portion of the SLA band of frequencies is revoked after a time interval; and
   in response to the grant termination message, defining the second grant as the primary grant for the supplemental downlink carrier aggregation.

11. The non-transitory computer-readable storage medium of claim 10, wherein, by defining the second grant as the primary grant, the second grant and the supplemental downlink carrier aggregation remain active after the use of first portion of the SLA band of frequencies is revoked.

12. The non-transitory computer-readable storage medium of claim 10, wherein the operations comprise, after the time interval has elapsed, ceasing use of the first portion of the SLA band of frequencies.

13. The non-transitory computer-readable storage medium of claim 12, wherein the operations comprise providing, addressed to the computer, a grant request for the first portion of the SLA band of frequencies.

14. The non-transitory computer-readable storage medium of claim 10, wherein the operations comprise receiving, associated with the computer, approval and authorization to use a third grant for a third portion of the SLA band of frequencies;
   wherein the third grant is also a secondary grant in the supplemental downlink carrier aggregation; and
   wherein the operations comprise, prior to defining the second grant as the primary grant, selecting the second grant as the primary grant from the second grant and the third grant based at least in part on communication-performance metrics of the second portion of the SLA band of frequencies and the third portion of the SLA band of frequencies.

15. The non-transitory computer-readable storage medium of claim 10, wherein the computer comprises a spectrum allocation server (SAS).

16. The non-transitory computer-readable storage medium of claim 10, wherein a given portion of the SLA band of frequencies comprises a band of frequencies associated with a Citizens Broadband Radio Service (CBRS).

17. A method for dynamically switching grants, comprising:
   by a radio node:
   receiving, associated with a computer, approval and authorization to use a first grant for a first portion of a shared-license-access (SLA) band of frequencies, and approval and authorization to use a second grant for a second portion of the SLA band of frequencies, wherein the first grant is a primary grant and the second grant is a secondary grant in a supplemental downlink carrier aggregation;
   providing a heartbeat request addressed to the computer;
   receiving, associated with the computer, a heartbeat response comprising a grant termination message for the first grant, wherein the grant termination message comprises a warning that indicates that the use of the first portion of the SLA band of frequencies is revoked after a time interval; and
   in response to the grant termination message, defining the second grant as the primary grant for the supplemental downlink carrier aggregation.

18. The method of claim 17, wherein, by defining the second grant as the primary grant, the second grant and the supplemental downlink carrier aggregation remain active after the use of first portion of the SLA band of frequencies is revoked.

19. The method of claim 17, wherein the method comprises:
   after the time interval has elapsed, ceasing use of the first portion of the SLA band of frequencies; and
   providing, addressed to the computer, a grant request for the first portion of the SLA band of frequencies.

20. The method of claim 17, wherein the method comprises receiving, associated with the computer, approval and authorization to use a third grant for a third portion of the SLA band of frequencies;
   wherein the third grant is also a secondary grant in the supplemental downlink carrier aggregation; and
   wherein the method comprises, prior to defining the second grant as the primary grant, selecting the second grant as the primary grant from the second grant and the third grant based at least in part on communication-performance metrics of the second portion of the SLA band of frequencies and the third portion of the SLA band of frequencies.

* * * * *